(12) United States Patent
McKeever

(10) Patent No.: US 8,882,034 B2
(45) Date of Patent: Nov. 11, 2014

(54) AIRCRAFT SEAT

(75) Inventor: John McKeever, London (GB)

(73) Assignee: Zodiac Seats UK Limited, Wales (GB)

( * ) Notice: Subject to any disclaimer, the term of this patent is extended or adjusted under 35 U.S.C. 154(b) by 540 days.

(21) Appl. No.: 12/747,997

(22) PCT Filed: Dec. 10, 2008

(86) PCT No.: PCT/GB2008/004058
§ 371 (c)(1),
(2), (4) Date: Aug. 23, 2010

(87) PCT Pub. No.: WO2009/077717
PCT Pub. Date: Jun. 25, 2009

(65) Prior Publication Data
US 2010/0308164 A1 Dec. 9, 2010

(30) Foreign Application Priority Data

Dec. 14, 2007 (GB) .................................. 0724397.5

(51) Int. Cl.
*B64D 11/06* (2006.01)
(52) U.S. Cl.
USPC ...................................................... 244/118.6
(58) Field of Classification Search
USPC ......... 244/118.5, 118.6, 122 R; 297/232, 240
See application file for complete search history.

(56) References Cited

U.S. PATENT DOCUMENTS

| 5,568,960 | A | 10/1996 | Oleson et al. |
| 6,209,956 | B1 * | 4/2001 | Dryburgh et al. ............. 297/245 |
| 2002/0070314 | A1 | 6/2002 | Schmidt-Schaeffer |

FOREIGN PATENT DOCUMENTS

| GB | A-2 326824 | 1/1999 |
| GB | 2362095 A | 11/2001 |
| JP | 08258796 | 10/1996 |
| JP | 10194021 | 7/1998 |
| JP | 2005532951 | 11/2005 |
| JP | 2009538251 | 11/2009 |

(Continued)

OTHER PUBLICATIONS

English translation of Notice of Reasons for Refusal dated Apr. 23, 2013 in Japanese Application No. 2010-537506.

(Continued)

*Primary Examiner* — Brian M O'Hara
(74) *Attorney, Agent, or Firm* — Kilpatrick Townsend & Stockton LLP; Dean W. Russell, Esq.; Kristin M. Crall, Esq.

(57) ABSTRACT

The seats are swivellable about axes (1) and arranged with their axes in column axes (2). The seats each have a direction (4) extending from the middle of the seat back through the middle of the seat cushion (22), intersecting the seat's swivel axis. Extending equally on either side of the seat direction is defined a seat projection (5) forwards of the seat cushion and having the same width as the seat cushion. The swivel is set up to allow the seat to be turned through 6 from 17.5 to the longitudinal axis of the column (and the aircraft to be equipped with the seats) to 23.5. At 17.5, as in column IV, the seats partially face the seats in front in the column. This is the maximum angle at which the regulatory authorities will allow a lap belt only to be worn by a passenger for TTL. When the seats are swivelled outwards to 23.5, they face the space (6) along side the seat in front and can be converted to bed mode.

14 Claims, 3 Drawing Sheets

(56) References Cited

FOREIGN PATENT DOCUMENTS

| | | |
|---|---|---|
| JP | 2010501447 | 1/2010 |
| WO | 2008/046027 | 4/2008 |
| WO | 2008046027 | 4/2008 |

OTHER PUBLICATIONS

English Abstract for Japanese Publication No. 11152094 published Jun. 8, 1999 (Japan Airlines Co).

* cited by examiner

Figure 1 - Prior Art

AIRCRAFT SEAT

The present invention relates to an aircraft seat.

Business and first class seats in aircraft usually convert from a sitting mode to a bed mode. Such seats are referred to in this specification as convertible seats. In the sitting mode, seats can be at a tighter pitch, i.e. spacing longitudinally of the aircraft, than they can be in bed mode, for the obvious reason that in bed mode the seat is longer.

It is known to arrange seats in a herring bone pattern, whereby the foot end of the seat in bed mode overlaps with the head end of the seat in front.

It is more usual in a herring bone LOPA (Lay Out of Passenger Accommodation) for the seats to be arranged head-out/feet-in, but head-in/feet-out LOPAs are known.

American Airline British Patent No 2,362,095 describes:

An airplane, system and passenger cabin comprising columns and rows (FIG. 1B) of recliners 220a-e in the form of compartments 106c-d is disclosed. Each recliner 220a-e comprises a rotatable and releasably lockable chair 232a-e with a detached ottoman/footrest 234a-e (which may also be used as a seat), towards which the chair faces after rotation from a first angular position (generally facing the front of the plane), through an angle of greater than 10 degrees, to a second angular position (facing a second stowable table 228a-e). Chair rotation to a third angular position (perpendicular to the first) allows the chair to face a first table 226a-e, window 236 or removable divider/partition (FIG. 1B), from which a recliner support may also be formed). When fully reclined (FIG. 3B), the armrests and upper surface of the seat are generally flush. Chair 232a-e (and FIG. 3A) also comprises an indicator and (FIG. 3D) which indicates when the chair is locked in to the first angular or any other desired position.

Figure 1:
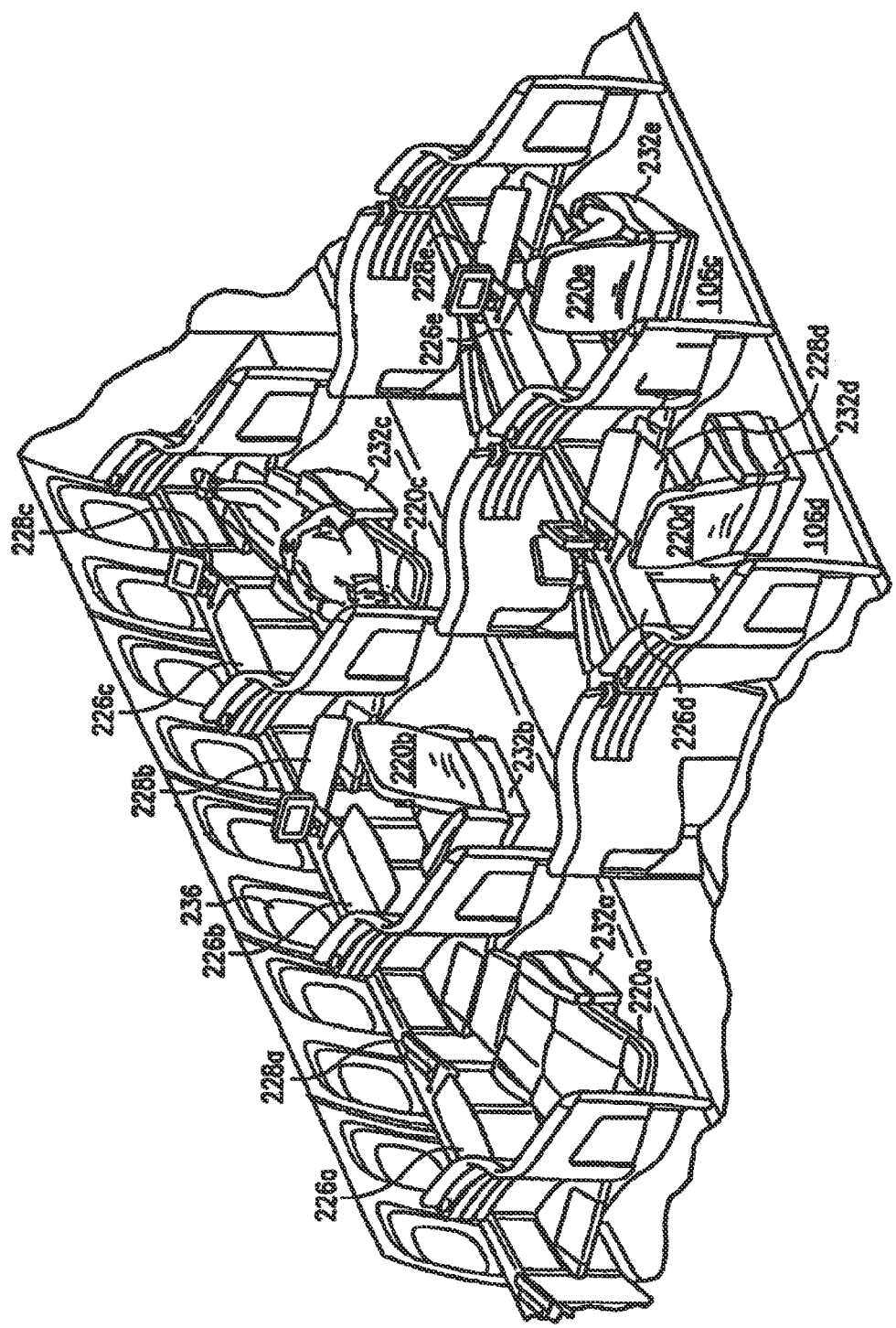

FIG. 1 accompanying this specification is illustrative of the possible swivel positions so the American Airlines patent, which can be summarised as:

Facing directly forwards for taxi, taking off and landing,
Facing directly outboard for dining and
Facing obliquely forwards for reclining and sleeping.

This American Airlines LOPA is not particularly efficient in terms of passenger accommodation, reflecting its first class usage.

The object of the present invention is to provide an improved LOPA utilising two swivel positions.

According to the invention there is provided a column of aircraft seats, the seats being of the type which are both swivellable and are convertible between a sitting mode and a bed mode, each seat being swivellable between facing in one direction and facing in only one other direction:

the one direction, for the second or a subsequent seat in the column, being a sitting mode direction oblique to an axis of the column with the seat least partially facing a seat in front with the seat facing at an angle with respect to an aircraft central axis such that lap belt restraint for taxi, take off and landing is permitted and the other direction being a more oblique bed mode direction, with the seat facing to one side of the seat in front, whereby the seat can be extended to its bed mode with the foot of the bed beside the seat in front.

Preferably, the seats being of the type which have a back rest and a seat cushion and which are convertible between a sitting mode and a bed mode, wherein:

each seat has:
a seat direction in which it faces and which is defined by an axis extending from the middle of the seat back through the middle of the seat cushion and
a seat projection which is defined by a width extending by half the width of the seat cushion on both sides of the seat axis;
each seat is mounted on a swivel for changing the seat's direction in the column;
each swivel has a swivel axis;
the swivel axes of the seats define a column axis; and
the column axis makes an angle with an aircraft central axis and
wherein:
the swivel is limited to provide two use directions of each seat:
an oblique sitting mode direction, in which for the second or a subsequent seat in the column:
the seat at least partially faces a seat in front in the column;
the seat's projection overlaps the seat in front and
the seat's axis makes an angle with the aircraft central axis such that lap belt restraint for taxi, take off and landing is permitted and
a more oblique bed mode direction, in which the seat faces to one side of the seat in front, without its projection overlapping the seat in front and with its axis making a greater angle with the aircraft central axis, whereby the seat can be extended to its bed mode with the foot of the bed beside the seat in front.

In a parallel walled aircraft cabin, the column axis is parallel to the aircraft central axis.

The normal maximum angle of obliqueness for normal lap belt restraint during taxi, take off and landing (TTL) is substantially 17.5°. The one direction can be more closely aligned with the column axis than the maximum allowed angle of obliqueness.

The advantage of the oblique TTL position is that the passenger using the seat has plenty of leg room to the one side of the seat in front without being cramped by the seat in front to an extent unacceptable for business class travel. Further an oblique TTL position allows a much more comfortable viewing of the take off and landing through the aircraft cabin windows.

In the preferred embodiment the seat includes a telescopic mechanism for extending the seat forwards into the bed mode, the final part of the telescopic extension engaging a leg rest with a fixed support remote from the seat.

Figure 2:
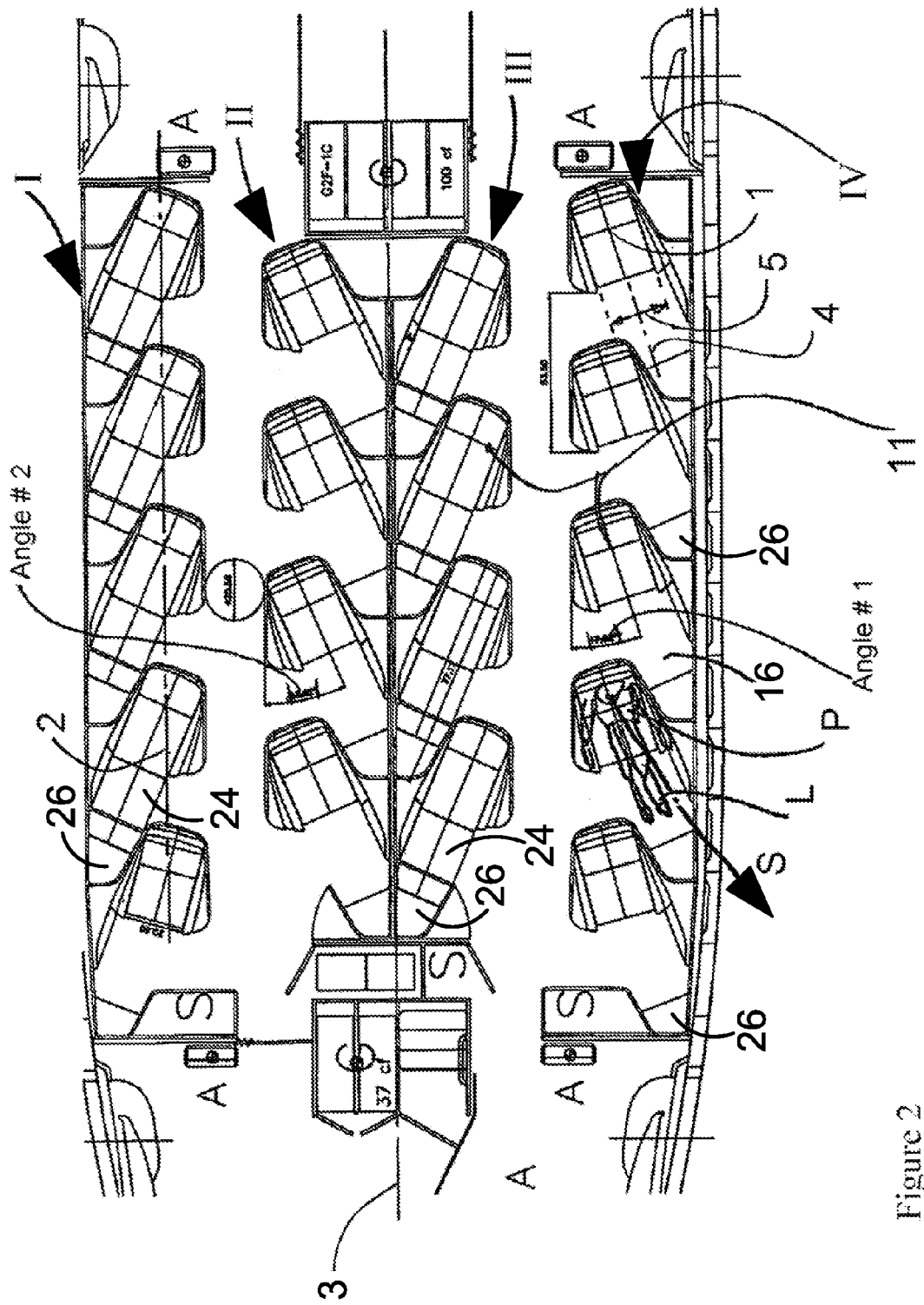
Figure 3:
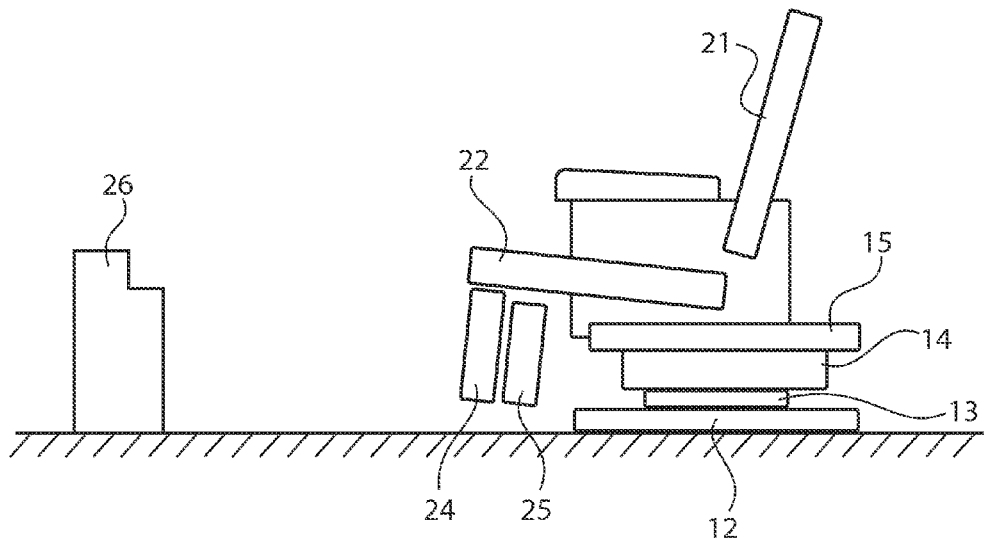

To help understanding of the invention, a specific embodiment thereof will now be described by way of example and with reference to the accompanying drawings, in which:

FIG. 1 is a partial reproduction of a typical view from the above mentioned American Airlines patent;
FIG. 2 is a LOPA of a column of aircraft seats in accordance with the present invention;
FIG. 3 is a diagrammatic side view of a seat for use in the invention, the seat being in sitting mode and
FIG. 4 is a similar view of the seat in bed mode.

Figure 4:
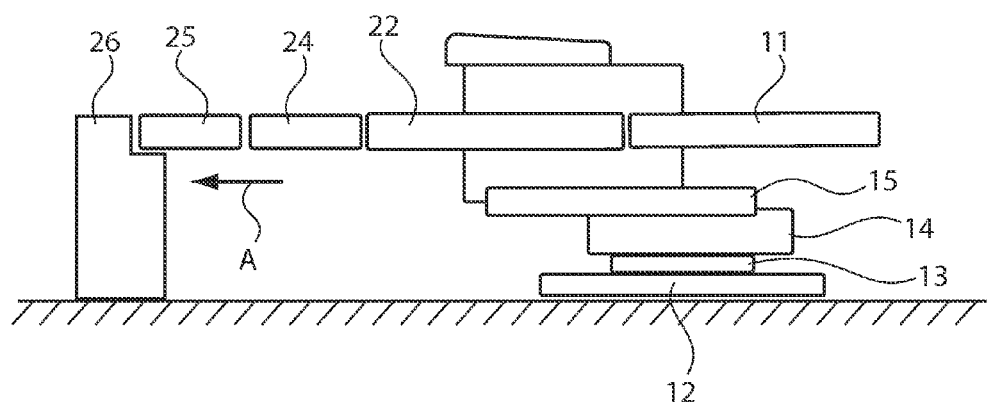

Referring to FIGS. 2 to 4 of the accompanying drawings, FIG. 2 shows four columns I, II, III, IV of seats 1, which are in bed mode in columns I & III, sitting mode for dining in column II and sitting mode for taxi, take-off and landing in column IV.

As described in more detail below, the seats are swivellable about axes 1 and arranged with their axes in column axes 2. Normally these will be parallel to the central axis of the aircraft 3. The seats each have a direction 4 extending from the middle of the seat back through the middle of the seat cushion 22, intersecting the seat's swivel axis. Extending equally on either side of the seat direction is defined a seat projection 5 forwards of the seat cushion and having the same width as the seat cushion.

The seats have a pallet 12 on which is mounted a lockable swivel 13, such as shown in U.S. Pat. No. 5,568,960. The swivel supports a seat chassis 14 including a telescopic slide 15. This can be as in patent application No 0706775.4. Full details of this will be open to public inspection by the time that this application is published. The swivel is set up to allow the seat to be turned through 6° from 17.5° to the longitudinal axis of the column (and the aircraft to be equipped with the seats) to 23.5°.

At 17.5°, as in column IV marked as Angle #1 in FIG. 2, the seats partially face the seats in front in the column. This is the maximum angle at which the regulatory authorities will allow a lap belt only to be worn by a passenger for TTL. Passengers P in these seats are able to see S out of the side windows of the aircraft, without having to crane sideways and are able to stretch their legs L into the space 6 adjacent the seat in front.

When the seats are swivelled outwards to 23.5°, marked as Angle #2 in FIG. 2, they face the space 6 along side the seat in front and can be converted to bed mode.

Turning to FIGS. 3 & 4, whilst the full details of the seat's recline mechanism is not shown, the seat includes a backrest 21, a seat cushion or pan 22, a leg rest 24 and a doubled back leg rest extension 25. When the seat is converted to bed mode, with the backrest, the seat cushion, the leg rest 24 and the doubled back extension all aligned, the last part of the conversion is a small advance in the direction A of the extended seat on the slide 15 so that the distal end of the extended leg rest is supported on a support 26 at the distal end of the bed.

The invention claimed is:

1. A cabin set of aircraft seats arrangeable in four columns in the cabin, two against a central divider and two against cabin walls, the seats being of the type which are convertible between a sitting mode and a bed mode, wherein:
    each seat has:
        a movable seat cushion,
        a foot rest support fixed in use adjacent to the central divider or one of the cabin walls,
        a movable back-rest, the cushion and back-rest being movable from the sitting mode to the bed mode to form a bed upon extension of a leg rest that is supported by the foot rest support in use,
    a seat direction in which the seat faces and which is defined by a seat axis extending from the middle of the back-rest through the middle of the seat cushion and
    a seat projection area extending equally on either side of the seat axis forwards of the seat cushion and having the same width as the seat cushion,
    wherein:
        each seat includes a swivel on which the seat is mounted for changing the seat's direction in the column,
        each swivel has a swivel axis, the swivel axes of the seats of each of the four columns defining an axis of the column that is arranged generally parallel with an aircraft central axis and
        each swivel is limited to provide two use directions of each seat:
            an oblique sitting mode direction, in which for the second or a subsequent seat in the column;
                the second or subsequent seat at least partially faces a seat in front in the column;
                the second or subsequent seat's projection area overlaps the seat in front and
                the second or subsequent seat's axis makes, with the aircraft central axis and towards the central divider or one of the cabin walls, a sitting mode angle such that a lap belt restraint for taxi, take off and landing is permitted and
            a more oblique bed mode direction, in which for the second or a subsequent seat in the column;
                the second or subsequent seat faces to one side of the seat in front;
                the second or subsequent seat's seat projection area does not overlap the seat in front, but overlaps the second or subsequent seat's own foot rest support;
                the second or subsequent seat's axis making, with the aircraft central axis and towards the central divider or one of the cabin walls, an angle that is greater than the sitting mode angle;
                the second or subsequent seat's seat can be extended to bed mode with the foot of the bed at the foot rest support beside the seat in front; and
        wherein two inside columns of seats face toward the central divider in the oblique bed mode and wherein two outside columns face toward the cabin wall in the oblique bed mode.

2. A column of aircraft seats as in claim 1, wherein the oblique sitting mode direction is substantially 17.5 degrees to the aircraft central axis.

3. A column of aircraft seats as in claim 2, wherein the angular extent of swiveling between the one and the other directions is substantially 6 degrees.

4. A column of aircraft seats as claimed in claim 2, wherein each seat includes a telescopic mechanism for extending the seat forwards into the bed mode, the final part of the telescopic extension engaging a leg rest with a fixed support remote from the seat.

5. A column of aircraft seats as claimed in claim 3, wherein each seat includes a telescopic mechanism for extending the seat forwards into the bed mode, the final part of the telescopic extension engaging a leg rest with a fixed support remote from the seat.

6. A column of aircraft seats as in claim 1, wherein the more oblique bed mode direction is substantially 23.5 degrees to the aircraft central axis.

7. A column of aircraft seats as in claim 6, wherein the angular extent of swiveling between the one and the other directions is substantially 6 degrees.

8. A column of aircraft seats as claimed in claim 6, wherein each seat includes a telescopic mechanism for extending the seat forwards into the bed mode, the final part of the telescopic extension engaging a leg rest with a fixed support remote from the seat.

9. A column of aircraft seats as claimed in claim 7, wherein each seat includes a telescopic mechanism for extending the seat forwards into the bed mode, the final part of the telescopic extension engaging a leg rest with a fixed support remote from the seat.

10. A column of aircraft seats as in claim 1, wherein the angular extent of swiveling between the one and the other directions is substantially 6 degrees.

11. A column of aircraft seats as claimed in claim 10, wherein each seat includes a telescopic mechanism for extending the seat forwards into the bed mode, the final part of the telescopic extension engaging a leg rest with a fixed support remote from the seat.

12. A column of aircraft seats as claimed in claim 1, wherein each seat includes a telescopic mechanism for extending the seat forwards into the bed mode, the final part of the telescopic extension engaging a leg rest with a fixed support remote from the seat.

13. A column of aircraft seats as claimed in claim 1, wherein each seat includes a telescopic mechanism for extending the seat forwards into the bed mode, the final part of the telescopic extension engaging a leg rest with a fixed support remote from the seat.

14. A cabin set of aircraft seats arrangeable in four columns in the cabin, two against a central divider and two against cabin walls, the seats being of the type which are convertible between a sitting mode and a bed mode, wherein:
   each seat has:
      a movable seat cushion,
      a foot rest support fixed in use adjacent to the central divider or one of the cabin walls,
      a movable back-rest, the cushion and back-rest being movable from the sitting mode to the bed mode to form a bed upon extension of a leg rest that is supported by the foot rest support in use,
   a seat direction in which the seat faces and which is defined by a seat axis extending from the middle of the back-rest through the middle of the seat cushion and
   a seat projection area extending equally on either side of the seat axis forwards of the seat cushion and having the same width as the seat cushion,
wherein:
   each seat includes a swivel on which the seat is mounted for changing the seat's direction in the column,
   each swivel has a swivel axis, the swivel axes of the seats of each of the four columns defining an axis of the column that is arranged generally parallel with an aircraft central axis and
   each swivel is limited to provide two use directions of each seat:
      an oblique sitting mode direction, in which for the second or a subsequent seat in the column;
         the second or subsequent seat at least partially faces a seat in front in the column;
         the second or subsequent seat's projection area overlaps the seat in front and
         the second or subsequent seat's axis makes, with the aircraft central axis and towards the central divider or one of the cabin walls, a sitting mode angle such that a lap belt restraint for taxi, take off and landing is permitted and
   a more oblique bed mode direction that is substantially 23.5 degrees to the aircraft central axis, in which for the second or a subsequent seat in the column;
      the second or subsequent seat faces to one side of the seat in front;
      the second or subsequent seat's seat projection area does not overlap the seat in front, but overlaps the second or subsequent seat's own foot rest support;
      the second or subsequent seat's axis making, with the aircraft central axis and towards the central divider or one of the cabin walls, an angle that is greater than the sitting mode angle;
      the second or subsequent seat's seat can be extended to bed mode with the foot of the bed at the foot rest support beside the seat in front; and
wherein two inside columns of seats face toward the central divider in the oblique bed mode and wherein two outside columns face toward the cabin wall in the oblique bed mode.

* * * * *